Sept. 25, 1928.
G. JOHNSON
1,685,404
LUBRICATING APPARATUS
Filed Aug. 25, 1925
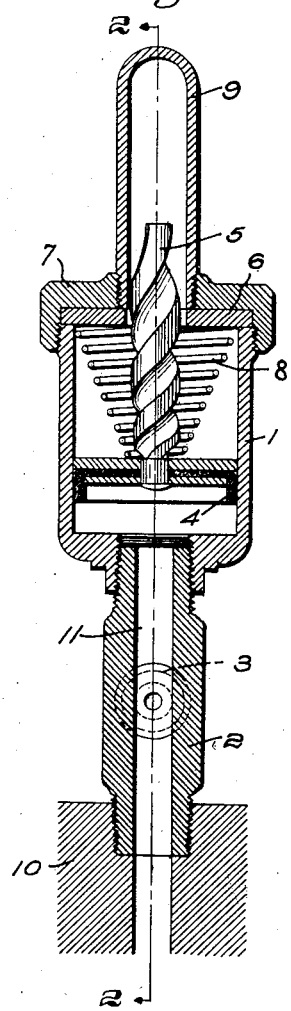
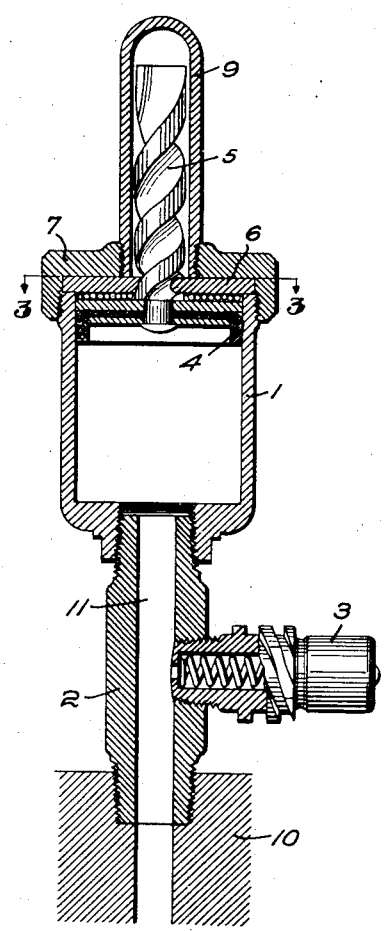
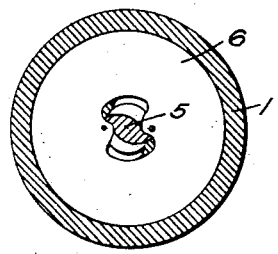
Inventor:
Gustav Johnson,
by Emery Booth Janney-Varney
Attys.

Patented Sept. 25, 1928.

1,685,404

UNITED STATES PATENT OFFICE.

GUSTAV JOHNSON, OF WEST ROXBURY, MASSACHUSETTS, ASSIGNOR, BY MESNE ASSIGNMENTS, TO THE BASSICK MANUFACTURING COMPANY, OF CHICAGO, ILLINOIS, A CORPORATION OF DELAWARE.

LUBRICATING APPARATUS.

Application filed August 25, 1925. Serial No. 52,388.

This invention aims to provide improvements in lubricating apparatus and more particularly to improvements in lubricant supply cups.

In the drawings, which illustrate a preferred embodiment of my invention:—

Figure 1 is a vertical section through a lubricant supply cup, being partly in elevation;

Fig. 2 is a section on the line 2—2 of Fig. 1, being partly in elevation; and

Fig. 3 is a section on the line 3—3 of Fig. 2.

Referring to the drawing, I have shown a lubricant supply cup particularly, though not exclusively, useful in connection with supplying lubricant to a bearing of a motor vehicle.

The cup includes a hollow cylinder 1 providing a supply reservoir, a conduit part 2 secured to the discharge end of the cylinder, a lubricant receiving nipple 3 threadedly secured to the discharge conduit, and means for forcing the lubricant from the reservoir.

The means for forcing the lubricant from the reservoir include a piston 4 reciprocable in the cylinder 1, a threaded stem 5 extending from the piston through a nut 6 clamped between the end of the cylinder and a removable head 7, and a cone-shaped coil spring 8 seated at one end against the nut 6 and the other end against the piston 4.

The screw thread of the stem 5 is shown as a double thread having a relatively steep pitch at one end and gradually diminishing toward the other end thereby to permit the spring to force the piston at a relatively uniform rate of travel throughout its entire stroke. Thus when the spring is fully compressed as illustrated, in Fig. 2, the threads cooperate with the nut so as to retard the action of the spring against the piston to permit only relatively slow movement thereof, while as the spring becomes more and more expanded (Fig. 1), the threads offer less and less resistance thereby permitting uniform movement of the piston and even flow of lubricant to the bearings.

A cup 9 is secured to the removable head 7 to keep dust and dirt from the reservoir and to protect the stem of the piston.

The cup may be secured directly to a bearing 10 as illustrated in Figs. 1 and 2 or it may be located in any convenient place and connected to the bearing by a piece of pipe or tubing.

In operation a source of lubricant under pressure may be coupled with the lubricant receiving nipple 3 so that the reservoir may be filled with lubricant. The lubricant flows through the nipple 2, the discharge passage 11 formed in the conduit 2, then to the cylinder 1 to force the piston 4 toward the top of the cylinder thereby filling the cup as shown in Fig. 2. After the supply of lubricant is disconnected from the nipple, the cup will then automatically begin to supply lubricant to the bearing at a very slow but substantially even rate. The threads of the nut 6 and stem 5 (Fig. 3) cooperate with the spring to operate the piston as hereinbefore described.

While I have shown and described a preferred embodiment of my invention it will be understood that changes involving omission, substitution, alteration and reversal of parts and even changes in the mode of operation may be made without departing from the scope of my invention which is best defined in the following claims.

Claims:

1. In a slow feed lubricant cup, the combination of a reservoir, a piston in said reservoir for forcing the lubricant therefrom, a spiral coil spring for forcing said piston toward the discharge end of said reservoir, a stem on said piston having a plurality of threads increasing in steepness away from said piston, a cover member for said piston having a threaded aperture adapted to cooperate with said threads and a cap on said cover for receiving and enclosing said stem.

2. In a slow feed lubricant cup, the combination of a reservoir, a piston in said reservoir for forcing the lubricant therefrom, a spiral coil spring for forcing said piston toward the discharge end of said reservoir, a stem on said piston having a plurality of threads increasing in steepness away from said piston, a cover member for said piston having a threaded aperture adapted to cooperate with said threads and a lubricant receiving nipple connected to the discharge end of said cup to permit the filling of said cup and returning said piston by forcing lubricant through said nipple to said reservoir.

3. In a slow feed lubricant cup, a sleeve threaded at each end and having an aperture in one side, a quick detachable receiving nipple threaded in said aperture, a lubricant reservoir threaded on one end of said sleeve, a piston adapted to reciprocate in said reservoir, said piston consisting of a back plate, a cup washer, a front plate, and a threaded stem riveted to said piston, a spiral spring about said stem for forcing said piston toward the discharge end of said reservoir, and a cover for said reservoir having a threaded aperture to cooperate with said stem.

4. A slow feed lubricant cup comprising, in combination, a reservoir, a piston in said reservoir for forcing the lubricant therefrom, a coil spring for forcing said piston toward the discharge end of said reservoir, nut and screw means cooperating with said spring to feed said piston at a relatively slow but uniform rate of speed throughout its entire stroke and a lubricant receiving nipple connected to the discharge end of said cup to permit filling of said cup and returning said piston by forcing lubricant through said nipple to said reservoir.

5. In a slow feed lubricant cup, a sleeve threaded at each end and having an aperture in one side, a quick detachable receiving nipple threaded in said aperture, a lubricant reservoir threaded on one end of said sleeve, a piston adapted to reciprocate in said reservoir, said piston consisting of a back plate, a cup washer, a front plate, and a threaded stem riveted to said piston, a spiral spring about said stem for forcing said piston toward the discharge end of said reservoir, said cover having a cap adapted to receive and enclose said stem.

In testimony whereof I have signed my name to this specification.

GUSTAV JOHNSON.